United States Patent
Yang

(10) Patent No.: US 11,457,130 B2
(45) Date of Patent: Sep. 27, 2022

(54) CAMERA MODULE INCLUDING A LENS MODULE, AND ELECTRONIC DEVICE INCLUDING A CAMERA MODULE

(71) Applicant: SAMSUNG ELECTRO-MECHANICS CO., LTD, Suwon-si (KR)

(72) Inventor: Jin Tae Yang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/181,216

(22) Filed: Feb. 22, 2021

(65) Prior Publication Data

US 2022/0094824 A1    Mar. 24, 2022

(30) Foreign Application Priority Data

Sep. 18, 2020  (KR) .......................... 10-2020-0120856

(51) Int. Cl.
*H04N 5/225* (2006.01)
*H04N 5/232* (2006.01)
(Continued)

(52) U.S. Cl.
CPC ............. *H04N 5/2253* (2013.01); *G03B 5/00* (2013.01); *G03B 13/36* (2013.01); *H04N 5/2252* (2013.01); *H04N 5/2254* (2013.01); *H04N 5/2257* (2013.01); *H04N 5/23287* (2013.01); *G03B 2205/0007* (2013.01); *G03B 2205/0069* (2013.01)

(58) Field of Classification Search
CPC .. H04N 5/2253; H04N 5/2254; H04N 5/2257; H04N 5/2259;
(Continued)

(56) References Cited

U.S. PATENT DOCUMENTS 7,952,612 B2 * 5/2011 Kakkori ............. H04N 5/23258
 348/208.6
10,863,094 B2 * 12/2020 Sharma ..................... G03B 3/10
(Continued)

FOREIGN PATENT DOCUMENTS

JP  2006-242995 A  * 9/2006  ............... G02B 7/04
JP  2006-242995 A    9/2006
(Continued)

OTHER PUBLICATIONS

Korean Office Action dated Jul. 14, 2021 in counterpart Korean Patent Application No. 10-2020-0120856 (8 pages in English and 5 pages in Korean).

*Primary Examiner* — Twyler L Haskins
*Assistant Examiner* — Akshay Trehan
(74) *Attorney, Agent, or Firm* — NSIP Law

(57) ABSTRACT

A camera module is provided. The camera module includes a lens module; a housing configured to accommodate the lens module; an image sensor module disposed below the lens module; and a first driving unit, configured to move the image sensor module in a direction perpendicular to an optical axis, and including a first coil disposed on the lens module and a first magnet disposed on the image sensor module, wherein the first coil may be formed in a shape of a ring having a hollow portion, and the first magnet may be disposed in the hollow portion of the first coil.

18 Claims, 7 Drawing Sheets

(51) Int. Cl.
*G03B 5/00* (2021.01)
*G03B 13/36* (2021.01)

(58) Field of Classification Search
CPC ........ H04N 5/23248–2329; G03B 2205/0069; G03B 5/00; G03B 13/36; G03B 2205/0007; G03B 2205/0015; G03B 2205/0038; G03B 2205/0053
USPC ........ 348/208.99, 208.1–208.16, 219.1, 335, 348/373–376; 310/12.16
See application file for complete search history.

(56) References Cited

U.S. PATENT DOCUMENTS

| | | | |
|---|---|---|---|
| 2011/0141294 A1* | 6/2011 | Lam ..................... | H04N 5/2328 348/E9.002 |
| 2011/0242340 A1* | 10/2011 | Miyawaki .......... | H04N 5/23287 348/E5.045 |
| 2013/0107068 A1* | 5/2013 | Kim ....................... | G03B 13/36 348/208.11 |
| 2017/0003517 A1* | 1/2017 | Sue .................... | H02K 41/0356 |
| 2017/0374247 A1* | 12/2017 | Minamisawa ....... | H04N 5/2252 |
| 2018/0041668 A1* | 2/2018 | Cui .......................... | G03B 3/10 |
| 2018/0173080 A1* | 6/2018 | Enta ..................... | H04N 5/2257 |
| 2019/0020822 A1* | 1/2019 | Sharma .............. | H04N 5/23261 |

FOREIGN PATENT DOCUMENTS

| | | | | |
|---|---|---|---|---|
| JP | 2011-221138 A | | 11/2011 | |
| JP | 2019-159268 A | * | 9/2019 | ............... G03B 5/00 |
| JP | 2019-159268 A | | 9/2019 | |
| KR | 10-0646560 B1 | | 11/2006 | |
| KR | 10-2020-0002357 A | | 1/2020 | |

\* cited by examiner

CAMERA MODULE INCLUDING A LENS MODULE, AND ELECTRONIC DEVICE INCLUDING A CAMERA MODULE

CROSS-REFERENCE TO RELATED APPLICATION(S)

This application claims the benefit under 35 USC § 119(a) of Korean Patent Application No. 10-2020-0120856 filed on Sep. 18, 2020 in the Korean Intellectual Property Office, the entire disclosure of which is incorporated herein by reference for all purposes.

BACKGROUND

1. Field

The following description relates to a camera module.

2. Description of Related Art

Recently, camera modules have been used in a mobile communication terminals such as smartphones, tablet personal computers (PCs) and laptop computers. Such camera modules may have functions such as autofocusing (AF) and optical image stabilization (OIS) in order to generate a high-resolution image.

In an example, the camera module may adjust a focus by moving a lens module in an optical axis direction, or may stabilize an optical image by moving the lens module in a direction perpendicular to the optical axis.

However, it may be beneficial to implement an actuator to move the lens module. However, the actuator may increase the height of the camera module.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a camera module includes a lens module; a housing, configured to accommodate the lens module; an image sensor module, disposed below the lens module; and a first driving unit, configured to move the image sensor module in a direction perpendicular to an optical axis, and including a first coil disposed on the lens module, and a first magnet disposed on the image sensor module, wherein the first coil is configured to have a shape of a ring having a hollow portion, and the first magnet is disposed in the hollow portion of the first coil.

The first magnet may have a first polarity and a second polarity in an optical axis direction.

The first magnet may include two magnets including poles, and disposed to be spaced apart from each other in an optical axis direction, and wherein the two magnets are disposed to allow their poles having a same polarity to face each other in the optical axis direction.

The image sensor module may include an image sensor and a movable frame on which the image sensor is mounted.

The lens module may have a groove portion disposed on a side surface thereof facing the first magnet.

The camera module may further include a second driving unit, configured to move the image sensor module in an optical axis direction, and comprising a second coil disposed in the housing and a second magnet disposed on the image sensor module.

The second coil may be configured to have a shape of a ring having a hollow portion, and the second magnet is disposed in the hollow portion of the second coil.

The second coil may be disposed to surround the image sensor module.

The second magnet may have a first polarity and a second polarity in the direction perpendicular to the optical axis.

The camera module may further include a second driving unit, configured to move the image sensor module in an optical axis direction, wherein the second driving unit includes a plurality of second coils each disposed in the housing, and having a hollow portion, and a plurality of second magnets each disposed on the image sensor module, and wherein the plurality of second magnets may be each disposed in each hollow portion of the plurality of second coils.

The plurality of second magnets may each include two magnets comprising poles, and disposed to be spaced apart from each other in the direction perpendicular to the optical axis, and wherein the two magnets may be disposed to allow their poles having a same polarity to face each other in the direction perpendicular to the optical axis.

In a general aspect, a camera includes a lens module, comprising at least one lens; a housing, in which the lens module is fixedly disposed; an image sensor module, disposed below the lens module; and a first driving unit comprising a first coil disposed in the housing and a first magnet disposed on the image sensor module, wherein the first driving unit is configured to generate a driving force in an optical axis direction, and wherein the first coil is configured to have a shape of a ring having a hollow portion, and the first magnet is disposed in the hollow portion of the first coil.

The first magnet may have a first polarity and a second polarity in a direction perpendicular to an optical axis.

A plurality of first magnets and a plurality of first coils may be each provided on the image sensor module, and the first magnets may be each disposed in each hollow portion of the first coils.

The camera module may further include a second driving unit, configured to move the image sensor module in a direction perpendicular to an optical axis, and including a second coil disposed on the lens module and a second magnet disposed on the image sensor module, wherein the second coil is configured to have a shape of a ring having a hollow portion, and the second magnet is disposed in the hollow portion of the second coil.

The second magnet may include two magnets disposed to be spaced apart from each other in the optical axis direction, and wherein the two magnets are disposed to allow their poles having the same polarity to face each other in the optical axis direction.

In a general aspect, an electronic device includes a camera module including a housing; a lens module, configured to be fixedly disposed in the housing; an image sensor module, configured to move in one or more of an optical axis direction and a direction perpendicular to the optical axis direction; and a driving unit, configured to move the image sensor module, and comprising one or more coils fixedly disposed in the housing, and one or more magnets attached to the image sensor module; wherein the one or more coils is configured to have ring shape with a hollow portion therein, and the one or more magnets is disposed in the hollow portion of the one or more coils.

The one or more coils may be attached to one of the housing and the lens module.

The one or more magnets may be disposed at respective ends of a movable frame of the image sensor module.

Other features and aspects will be apparent from the following detailed description, the drawings, and the claims.

Figure 1:
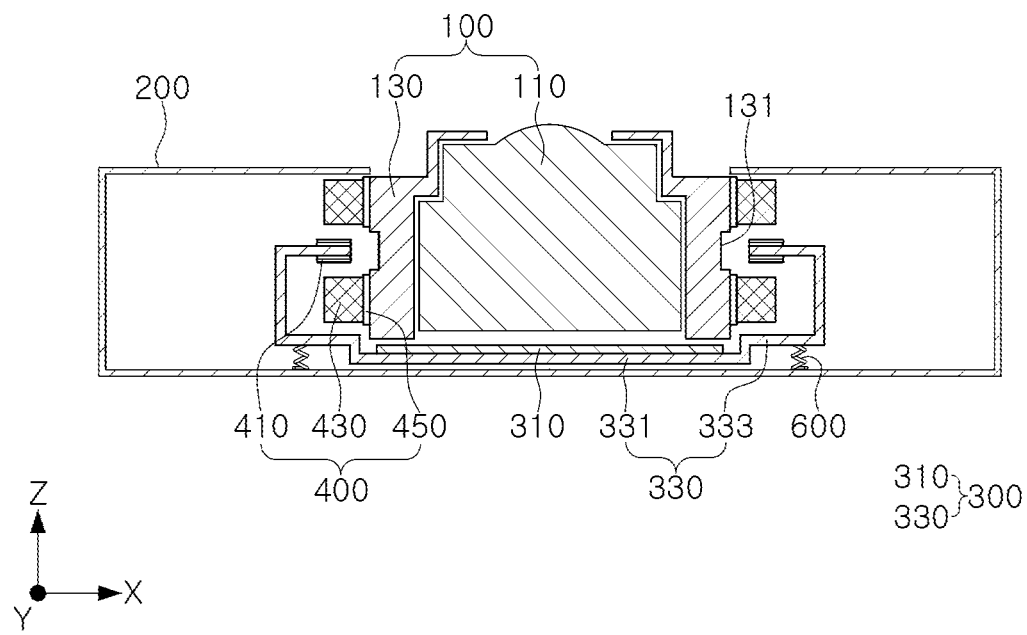
FIG. 1 illustrates a schematic cross-sectional view of an example camera module, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

FIG. 1 is a schematic cross-sectional view of an example camera module, in accordance with one or more embodiments.

Referring to FIG. 1, the example camera module may include: a lens module 100; a housing 200 that accommodates the lens module 100; an image sensor module 300; and a first driving unit 400 that moves the image sensor module 300.

The lens module 100 may include a lens barrel 110 and a carrier 130.

The lens barrel 110 may accommodate at least one lens that is configured to image a subject. When a plurality of lenses is arranged in the lens barrel 110, the plurality of lenses may be mounted in the lens barrel 110 along an optical axis. The lens barrel 110 may be formed in a hollow cylindrical shape.

The lens barrel 110 may be coupled with the carrier 130. The carrier 130 may be formed in a box shape.

The lens barrel 110 and the carrier 130 may be accommodated in the housing 200. In an example, the lens module 100 may be fixedly disposed in the housing 200.

The image sensor module 300 may be disposed below the lens module 100. The image sensor module 300 is a device that converts light incident through the lens module 100 into an electrical signal.

The image sensor module 300 may include an image sensor 310 and a movable frame 330 on which the image sensor 310 is mounted. A printed circuit board (not shown) may be disposed on the movable frame 330, and the image sensor 310 may be electrically connected to the printed circuit board.

The image sensor 310 may convert the light incident through the lens module 100 into the electrical signal. In a non-limited example, the image sensor 310 may be a charge coupled device (CCD) or a complementary metal-oxide semiconductor (CMOS).

The electrical signal converted by the image sensor 310 may be output as an image through a display unit of a portable electronic device on which the camera module is mounted.

The image sensor module 300 may be moved in a direction perpendicular to the optical axis (Z-axis).

The camera module according to an example may stabilize an optical image during image capture by moving the image sensor module 300 in the direction perpendicular to the optical axis (Z-axis).

When the lens module 100 is moved to stabilize the optical image, the camera module may have an increased height by an actuator moving the lens module 100 or the like. However, the camera module according to an example may move the image sensor module 300 instead of the lens module 100, and may thus have a reduced height.

The first driving unit 400 may generate a driving force to allow the image sensor module 300 to be moved in the direction perpendicular to the optical axis (Z-axis).

The first driving unit 400 may include a first magnet 410 and a first coil 430. In an example, the first coil 430 may be formed in a shape of a ring having a hollow portion, and may be disposed on the lens module 100. A substrate 450 may be disposed on the side surface of the lens module 100, and the first coil 430 may be disposed on the substrate 450.

The first magnet 410 may be disposed in the hollow portion of the first coil 430. For example, the first magnet 410 may be disposed on the image sensor module 300 to be disposed in the hollow portion of the first coil 430.

The movable frame 330 of the image sensor module 300 may include a body portion 331 on which the image sensor 310 is disposed and a first extension portion 333 extending from the body portion 331. The end of the first extension portion 333 may be disposed in the hollow portion of the first coil 430. The first magnet 410 may be disposed at the end of the movable frame 330, for example, the first extension portion 333 of the movable frame 330.

The driving force may be generated in the direction perpendicular to the optical axis (Z-axis) by an interaction between the first magnet 410 and the first coil 430.

The first coil 430 is a fixed member disposed on the lens module 100, and the first magnet 410 may thus be moved in the direction perpendicular to the optical axis (Z-axis) by the driving force.

The first magnet 410 may be disposed on the movable frame 330, and the first magnet 410 and the movable frame 330 may thus be moved together in the direction perpendicular to the optical axis (Z-axis).

When the first magnet 410 and the movable frame 330 are moved in the direction perpendicular to the optical axis (Z-axis), a groove portion 131 may be disposed in the lens module 100 to prevent the lens module 100 from interfering the first magnet 410 and the movable frame 330. The lens module 100 may include the groove portion 131 disposed on a side surface of the lens module 100 facing the first magnet 410.

In an example, an elastic member 600 supporting the movement of the movable frame 330 may be disposed on the movable frame 330. A first end of the elastic member 600 may be coupled to the movable frame 330, and a second end of the elastic member 600 may be coupled to the housing 200.

Figure 2:
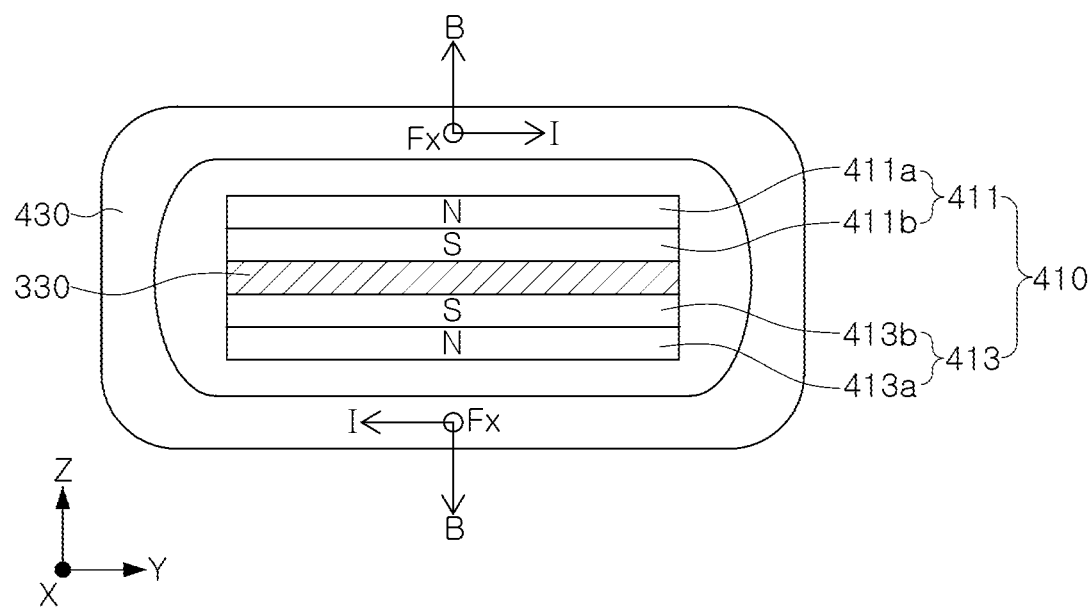
FIG. 2 illustrates a view of arrangements of the first magnet and first coil of an example first driving unit, in accordance with one or more embodiments.
Figure 3:
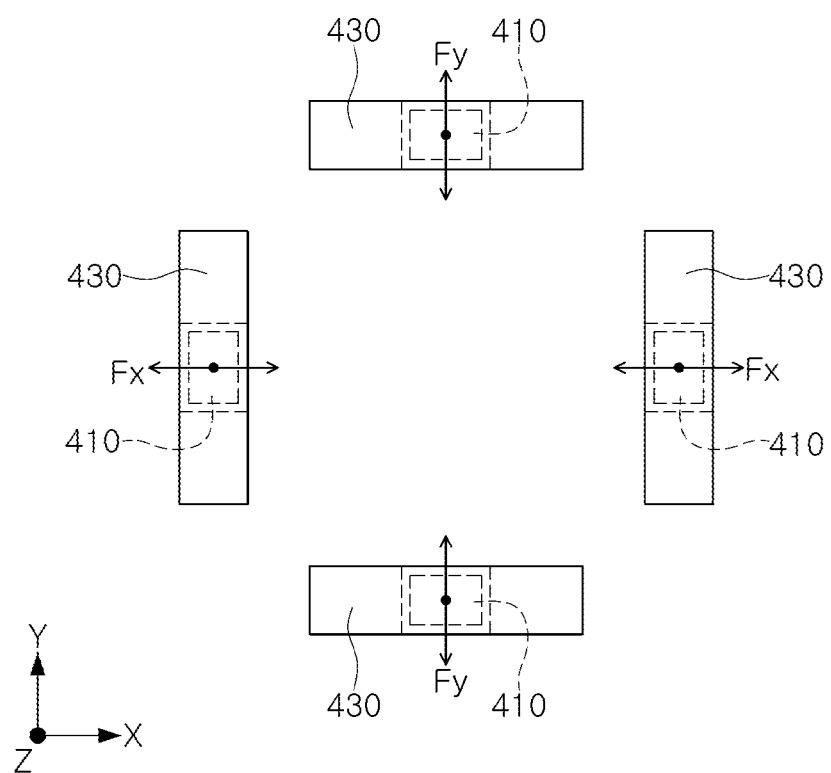
FIG. 3 illustrates a schematic plan view of an example first driving unit of an example camera module, in accordance with one or more embodiments.

FIG. 2 illustrates arrangements of the first magnet and first coil of a first driving unit; and FIG. 3 is a schematic plan view of the first driving unit of the camera module, in accordance with one or more embodiments.

Referring to FIG. 2, in an example, the first coil 430 may have the shape of a ring having a hollow portion, and the first magnet 410 may be disposed in the hollow portion 131 of the first coil 430.

In an example, the first magnet 410 may include two magnets 411 and 413 disposed to be spaced apart from each other in the optical axis (Z-axis) direction.

The two magnets 411 and 413 may each be fixed to the movable frame 330. For example, one of the two magnets 411 and 413, e.g., the magnet 411, may be fixed to an upper surface of the movable frame 330, and the other of the two magnets, e.g., the magnet 413, may be fixed to a lower surface of the movable frame 330.

The magnet 411 may have a first polarity 411a and a second polarity 411b in the optical axis (Z-axis) direction. The first polarity 411a may be the polarity of a north (N) pole or a south (S) pole, and the second polarity 411b may be the polarity of the S pole or N pole, which is opposite to the first polarity 411a.

In an example, the magnet 411 may have the N pole upward in the optical axis (Z-axis) direction and the S pole downward in the optical axis (Z-axis) direction. However, the magnet 411 is not limited to this polarity arrangement, and its polarity arrangement may be reversed.

The magnet 413 may have a first polarity 413a and a second polarity 413b in the optical axis (Z-axis) direction. The first polarity 413a may be the polarity of the N pole or S pole, and the second polarity 413b may be the polarity of the S pole or N pole, which is opposite to the first polarity 413a.

In an example, the magnet 413 may have the S pole upward in the optical axis (Z-axis) direction and the N pole downward in the optical axis (Z-axis) direction. However, the magnet 413 is not limited to this polarity arrangement, and its polarity arrangement may be reversed.

The N pole may be each surface of the two magnets 411 and 413 directly facing the inner surface of the first coil 430, and the S pole may be each surface opposite thereto. However, the two magnets 411 and 413 are each not limited to this polarity arrangement, and this polarity arrangement may be reversed.

The two magnets 411 and 413 may be disposed to allow their poles having the same polarity to oppose each other in the optical axis (Z-axis) direction.

For example, the S pole of the magnet 411 and the S pole of the magnet 413 may oppose each other in the Z-axis direction. Alternatively, the N pole of the magnet 411 and the N pole of the magnet 413 may be disposed to oppose each other in the Z-axis direction.

Referring to FIG. 2, the driving force may be generated in the direction perpendicular to the optical axis (Z-axis), e.g., in a first axis (X-axis) direction, by the interaction between the two magnets 411 and 413 with the first coil 430.

Therefore, the image sensor module 300 on which the first magnet 410 is mounted may be moved in the direction perpendicular to the optical axis (Z-axis).

The camera module, in accordance with one or more embodiments, may have the first magnet 410 disposed in the hollow portion of the first coil 430, thereby reducing the size of the first magnet 411, and may thus have a reduced overall height.

Referring to FIG. 3, the camera module, in accordance with one or more embodiments, may include a plurality of first driving units 400. In an example, the camera module may have four first driving units 400. Two of the first driving units 400 may be disposed to be spaced apart from each other in the first axis (X-axis) direction perpendicular to the optical axis (Z-axis), and the other two of the first driving units 400 may be disposed to be spaced apart from each other in a second axis (Y-axis) direction perpendicular to both the optical axis (Z-axis) and the first axis (X-axis). However, the first driving units 400 are not limited to this arrangement, and one first driving unit 400 may be disposed for each axis.

Accordingly, the first driving units 400 may each generate driving force Fx in the first axis (X-axis) direction and driving force Fy in the second axis (Y-axis) the direction.

Figure 4:
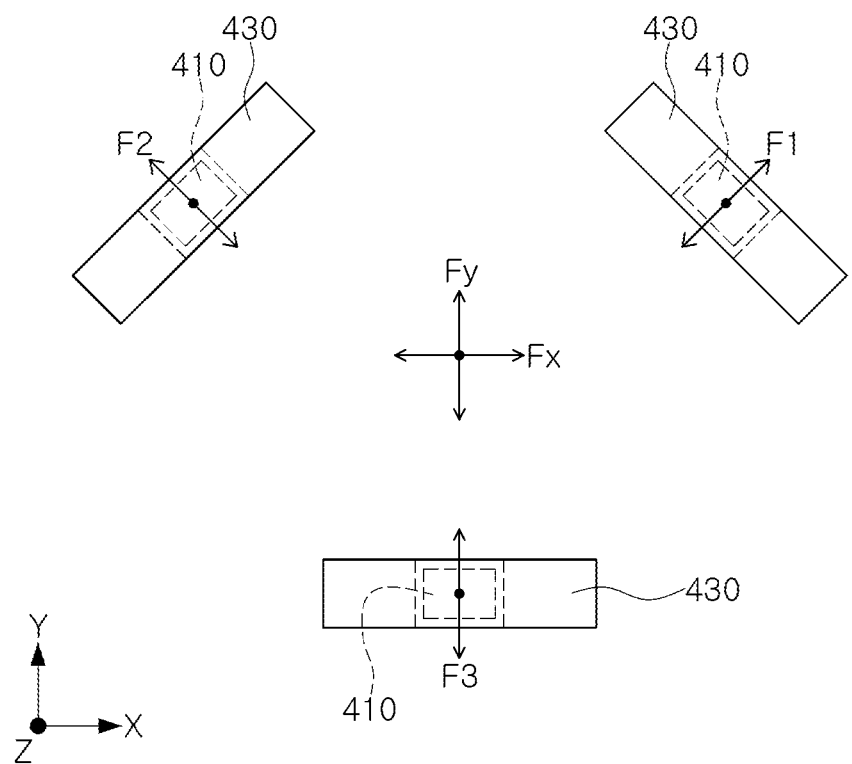
FIG. 4 illustrates a modified example of the first driving unit shown in FIG. 3.

FIG. 4 is a modified example of the first driving unit shown in FIG. 3.

Referring to FIG. 4, the camera module, in accordance with one or more embodiments, may include three first driving units 400. The three first driving units 400 may be arranged to be spaced apart from one another at intervals of 120°.

Additionally, in an example a magnitude of the driving force generated from each first driving unit 400 may be adjusted to generate the driving force Fx in the first axis (X-axis) direction and the driving force Fy in the second axis (Y-axis) the direction.

Figure 5:
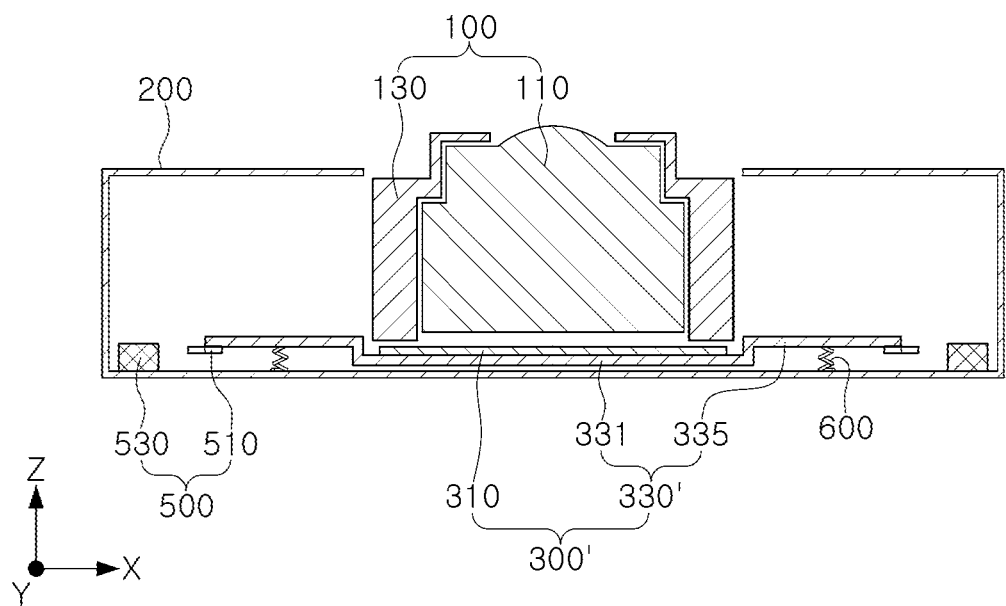
FIG. 5 illustrates a schematic cross-sectional view of an example camera module, in accordance with one or more embodiments.

FIG. 5 is a schematic cross-sectional view of an example camera module, in accordance with one or more embodiments.

Referring to FIG. 5, the camera module, in accordance with one or more embodiments, may include a lens module 100, a housing 200 that accommodates the lens module 100, an image sensor module 300' and a second driving unit 500 that moves the image sensor module 300'.

The image sensor module 300' may be moved in an optical axis (Z-axis) direction.

The camera module, in accordance with one or more embodiments, may adjust a focus by moving the image sensor module 300' in the Z-axis direction.

When the lens module 100 is moved to adjust the focus, the camera module may have an increased height by an actuator that moves the lens module 100 or the like. However, the camera module, in accordance with one or more embodiments, may move the image sensor module 300' instead of the lens module 100, and may thus have a reduced height.

The second driving unit 500 may generate a driving force to allow the image sensor module 300' to be moved in the optical axis (Z-axis) direction.

The second driving unit 500 may include a second magnet 510 and a second coil 530. The second coil 530 may be formed in a shape of a ring having a hollow portion, and may be disposed in the housing 200. The second coil 530 may be disposed to surround the image sensor module 300'. That is, the image sensor module 300' may be disposed in the hollow portion of the second coil 530.

The second magnet 510 may be disposed in the hollow portion of the second coil 530. For example, the second magnet 510 may be disposed on the image sensor module 300' to be positioned in the hollow portion of the second coil 530.

A movable frame 330' of the image sensor module 300' may include a body portion 331 on which the image sensor 310 is disposed and a second extension portion 335 extending from the body portion 331. A first end of the second extension portion 335 may be disposed in the hollow portion of the second coil 530. The second magnet 510 may be disposed at the first end of the movable frame 330', for example, the second extension portion 335 of the movable frame 330'.

The driving force may be generated in the Z-axis direction by an interaction between the second magnet 510 and the second coil 530.

The second coil 530 is a fixed member disposed in the housing 200, and the second magnet 510 may thus be moved in the Z-axis direction by the driving force.

The second magnet 510 may be disposed on the movable frame 330', and the second magnet 510 and the movable frame 330' may thus be moved together in the Z-axis direction.

Figure 6:
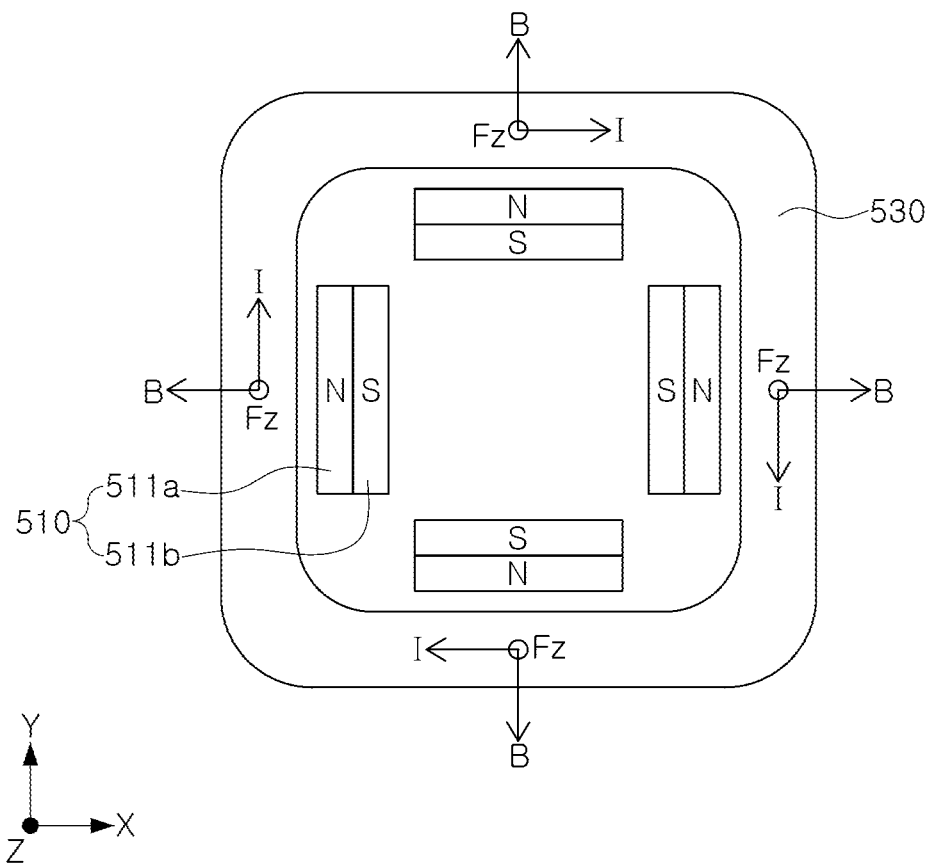
FIG. 6 illustrates a view of arrangements of a second magnet and a second coil of a second driving unit.

FIG. 6 illustrates arrangements of the second magnet and second coil of the second driving unit.

Referring to FIG. 6, the second coil 530 may have the shape of a ring having a hollow portion, and the second magnet 510 may be disposed in the hollow portion of the second coil 530.

The second magnet 510 may include a plurality of magnets disposed to be spaced apart from each other in a direction perpendicular to the optical axis (Z-axis). For example, the second magnet 510 may include two magnets disposed to be spaced apart from each other in a first axis (X-axis) direction and the other two magnets disposed to be spaced apart from each other in a second axis (Y-axis) direction.

The second magnet 510 may have a first polarity 511a and a second polarity 511b in the direction perpendicular to the optical axis (Z-axis). The first polarity 511a may be the polarity of a north (N) pole or south (S) pole, and the second polarity 511b may be the polarity of the S pole or N pole, which is opposite to the first polarity 511a.

For example, a first surface of the second magnet 510 directly facing the inner surface of the second coil 530 may have the N pole, and an opposite second surface may have the S pole. However, the second magnet 510 is not limited to this polarity arrangement, and its polarity arrangement may be reversed.

Referring to FIG. 6, driving force Fz may be generated in the Z-axis direction by the interaction between the second magnet 510 and the second coil 530.

Therefore, the image sensor module 300' on which the second magnet 510 is mounted may be moved in the optical axis (Z-axis) direction.

The camera module, in accordance with one or more embodiments, may have the second magnet 510 disposed in the hollow portion of the second coil 530, thereby reducing the size of the second magnet 510, and may thus have a reduced overall height.

Figure 7:
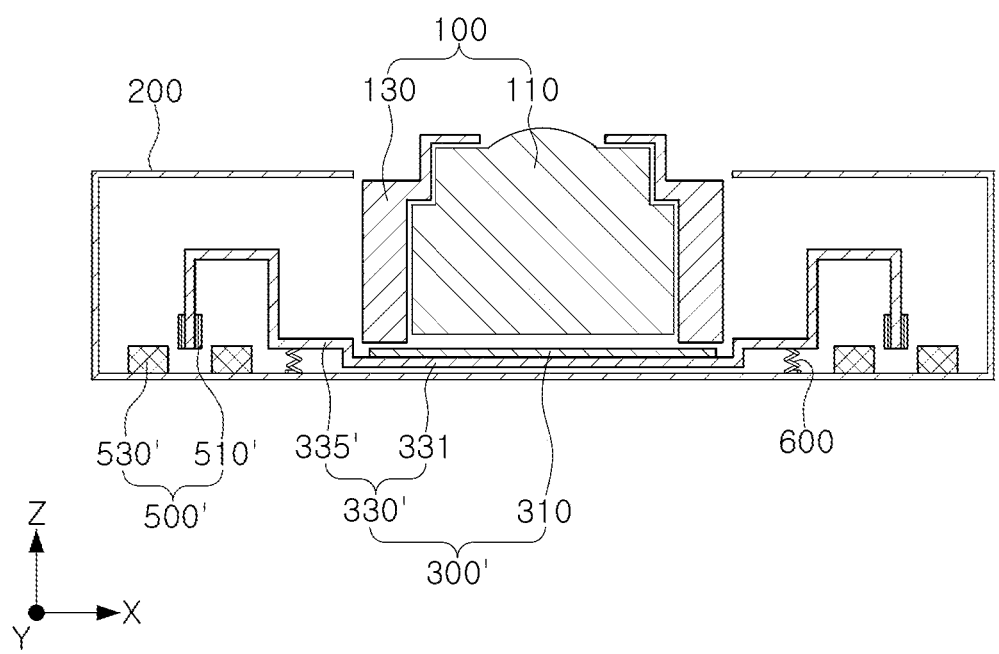
FIGS. 7 and 8 respectively illustrate modified examples of the second driving unit shown in FIGS. 5 and 6.
Figure 8:
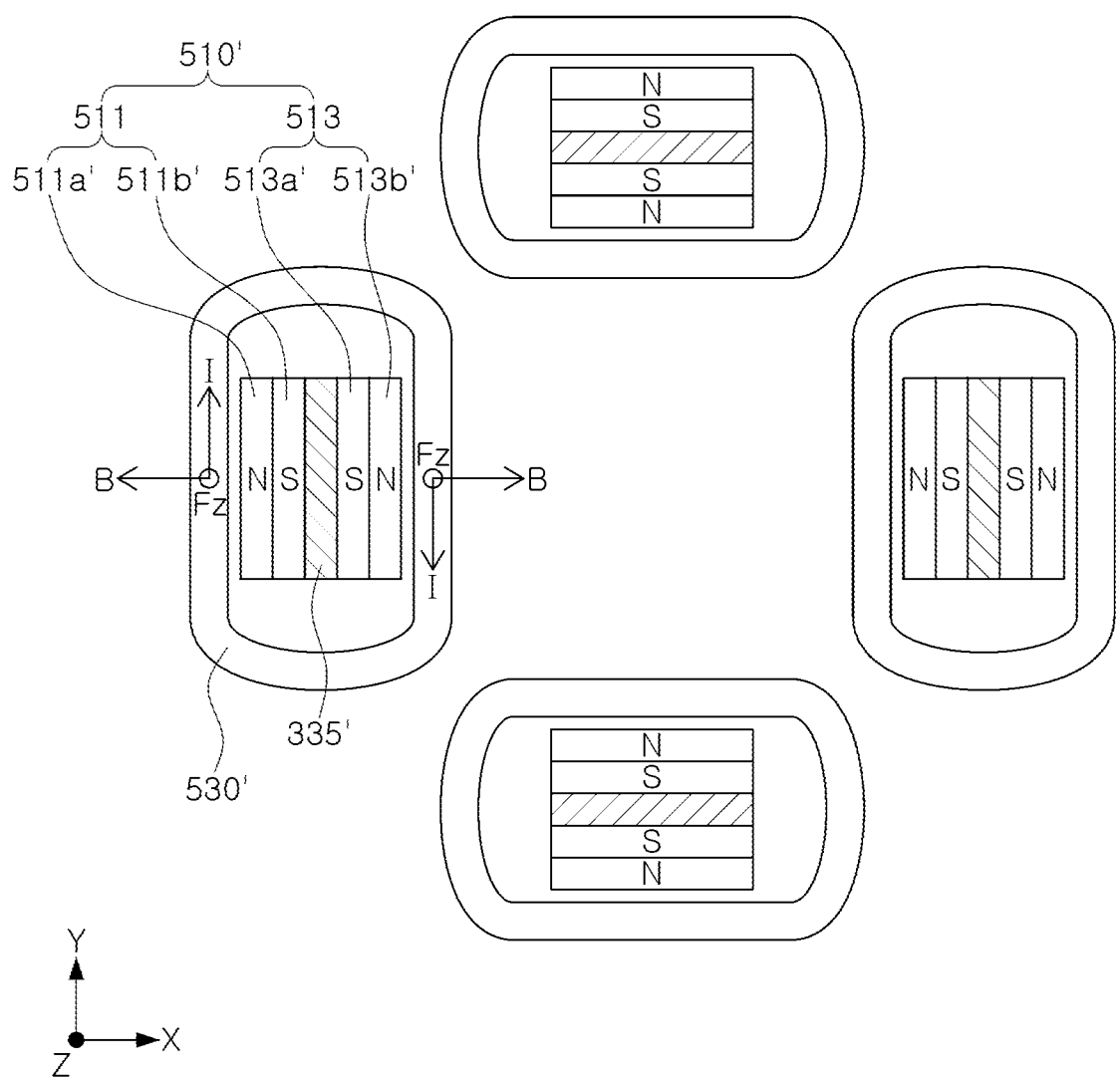

FIGS. 7 and 8 respectively illustrate modified examples of the second driving unit shown in FIGS. 5 and 6.

Referring to FIG. 7, the second driving unit 500' may include a plurality of second magnets 510' and a plurality of second coils 530'.

The plurality of second coils 530' may each be formed in a shape of a ring having a hollow portion, and the plurality of second magnets 510' may each be disposed in each hollow portion of the plurality of second coils 530'.

The plurality of second magnets 510' may each include two magnets 511 and 513 disposed to be spaced apart from each other in the direction perpendicular to the optical axis (Z-axis).

The two magnets 511 and 513 may each be fixed to the movable frame 330'.

A movable frame 330' of the image sensor module 300' may include a body portion 331 on which the image sensor 310 is disposed and a second extension portion 335' extending from the body portion 331. An end of the second extension portion 335' may be disposed in the hollow portion of the second coil 530'. The plurality of second magnets 510' may be disposed at the end of the movable frame 330', for example, the second extension portion 335' of the movable frame 330'.

The two magnets 511 and 513 may each have a first polarity 511a' and a second polarity 511b' in the direction perpendicular to the optical axis (Z-axis). The first polarity 511a' may be the polarity of a north (N) pole or south (S) pole, and the second polarity 511b' may be the polarity of the S pole or N pole, which is opposite to the first polarity 511a'.

In an example, the N pole may be each surface of the two magnets 511 and 513 directly facing the inner surface of the second coil 530', and the S pole may be each surface opposite thereto. However, the two magnets 511 and 513 are each not limited to this polarity arrangement, and this polarity arrangement may be reversed.

The two magnets 511 and 513 may be disposed to allow their poles having the same polarity to oppose each other in the direction perpendicular to the optical axis (Z-axis).

For example, the S pole of the magnet 511 and the S pole of the magnet 513 may oppose each other in the direction perpendicular to the optical axis (Z-axis). Alternatively, the N pole of the magnet 511 and the N pole of the magnet 513 may be disposed to oppose each other in the direction perpendicular to the optical axis (Z-axis).

Referring to FIGS. 7 and 8, the driving force Fz may be generated in the optical axis (Z-axis) direction by an interaction between the second magnet 510' and the second coil 530'.

Therefore, the image sensor module 300' on which the second magnet 510' is mounted may be moved in the optical axis (Z-axis) direction.

The camera module, in accordance with one or more embodiments, may have the second magnet 510' disposed in the hollow portion of the second coil 530', thereby reducing the size of the second magnet 510', and may thus have a reduced overall height.

Figure 9:
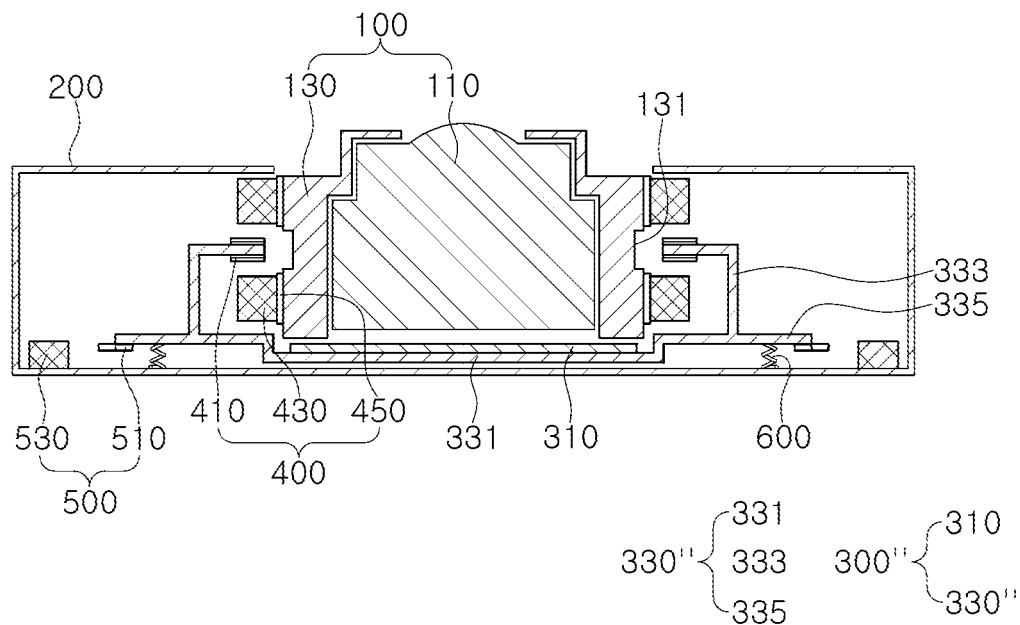
FIG. 9 illustrates a schematic cross-sectional view of a camera module, in accordance with one or more embodiments.
Figure 10:
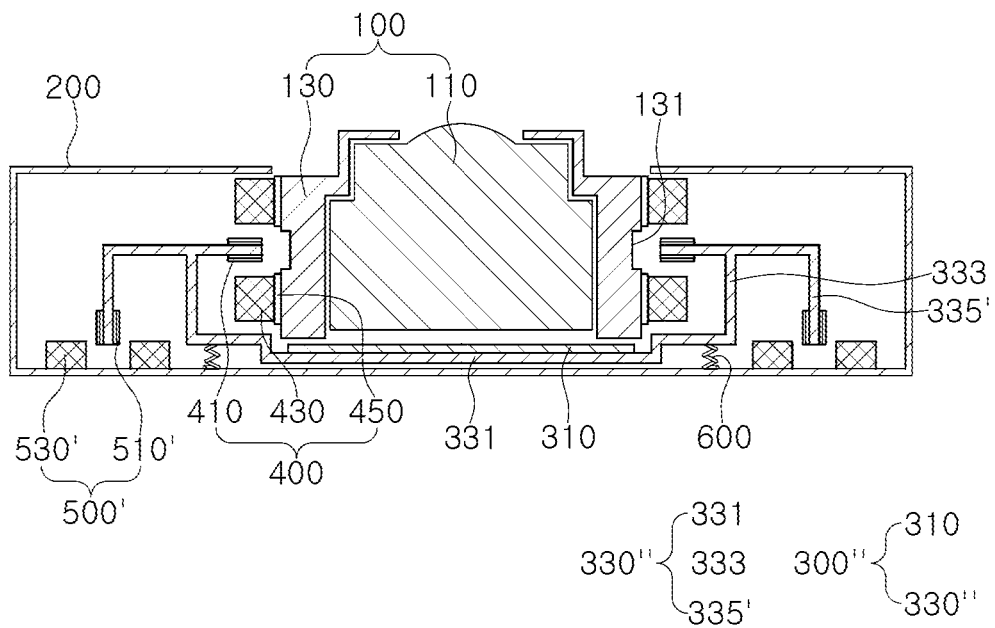
FIG. 10 illustrates a schematic cross-sectional view of an example camera module, in accordance with one or more embodiments.

FIG. 9 is a schematic cross-sectional view of an example camera module, in accordance with one or more embodiments, and FIG. 10 is a schematic cross-sectional view of an example camera module, in accordance with one or more embodiments.

In the examples of FIGS. 9 and 10, an image sensor module 300" may be moved in optical axis (Z-axis), first axis (X-axis) and second axis (Y-axis) directions.

Referring to FIG. 9, in the example of FIG. 9 may be a combination of an example illustrated in FIG. 1 and an example illustrated in FIG. 5.

In an example, the camera module, in accordance with one or more embodiments, may include the first driving unit 400 and the second driving unit 500. The movable frame 330" may include the body portion 331 on which the image sensor 310 is disposed, the first extension portion 333 on which the first magnet 410 of the first driving unit 400 is mounted, and the second extension portion 335 on which the second magnet 510 of the second driving unit 500 is mounted.

Referring to FIG. 10, an example illustrated in FIG. 10 may be a combination of an example illustrated in FIG. 1 and an example illustrated in FIG. 7.

In an example, the camera module, in accordance with one or more embodiments, may include the first driving unit 400 and the second driving unit 500'. The movable frame 330" may include the body portion 331 on which the image sensor 310 is disposed, the first extension portion 333 on which the first magnet 410 of the first driving unit 400 is mounted, and the second extension portion 335' on which the second magnet 510' of the second driving unit 500' is mounted.

As set forth above, the camera module, in accordance with one or more embodiments, may have a smaller size.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a lens module;
   a housing, configured to accommodate the lens module;
   an image sensor module, disposed below the lens module; and
   a first driving unit, configured to move the image sensor module in a direction perpendicular to an optical axis, and comprising a first coil disposed on the lens module, and a first magnet disposed on the image sensor module,
   wherein the first coil is configured to have a shape of a ring having a hollow portion, and the first magnet is disposed in the hollow portion of the first coil, and
   wherein the first magnet has a first polarity and a second polarity in an optical axis direction.

2. The camera module of claim 1, wherein the first magnet comprises two magnets comprising poles, and disposed to be spaced apart from each other in an optical axis direction, and
   wherein the two magnets are disposed to allow their poles having a same polarity to face each other in the optical axis direction.

3. The camera module of claim 1, wherein the image sensor module comprises an image sensor and a movable frame on which the image sensor is mounted.

4. The camera module of claim 1, wherein the lens module has a groove portion disposed on a side surface thereof facing the first magnet.

5. The camera module of claim 1, further comprising a second driving unit, configured to move the image sensor module in an optical axis direction, and comprising a second coil disposed in the housing and a second magnet disposed on the image sensor module.

6. The camera module of claim 5, wherein the second coil is configured to have a shape of a ring having a hollow portion, and the second magnet is disposed in the hollow portion of the second coil.

7. The camera module of claim 6, wherein the second coil is disposed to surround the image sensor module.

8. The camera module of claim 6, wherein the second magnet has a first polarity and a second polarity in the direction perpendicular to the optical axis.

9. The camera module of claim 1, further comprising a second driving unit, configured to move the image sensor module in an optical axis direction,
wherein the second driving unit comprises a plurality of second coils each disposed in the housing, and having a hollow portion, and a plurality of second magnets each disposed on the image sensor module, and
wherein the plurality of second magnets are each disposed in each hollow portion of the plurality of second coils.

10. The camera module of claim 9, wherein the plurality of second magnets each comprise two magnets comprising poles, and disposed to be spaced apart from each other in the direction perpendicular to the optical axis, and
wherein the two magnets are disposed to allow their poles having a same polarity to face each other in the direction perpendicular to the optical axis.

11. A camera module, comprising:
a lens module, comprising at least one lens;
a housing, in which the lens module is fixedly disposed;
an image sensor module, disposed below the lens module; and
a first driving unit comprising a first coil disposed in the housing and a first magnet disposed on the image sensor module,
wherein the first driving unit is configured to generate a driving force in an optical axis direction,
wherein the first coil is configured to have a shape of a ring having a hollow portion, and the first magnet is disposed in the hollow portion of the first coil, and
wherein the first magnet has a first polarity and a second polarity in a direction perpendicular to an optical axis.

12. The camera module of claim 11, wherein the first magnet comprises a plurality of first magnets each provided on the image sensor module, the first coil comprises a plurality of first coils each disposed in the housing, and the first magnets are each disposed in respective hollow portions of the first coils.

13. The camera module of claim 11, further comprising a second driving unit, configured to move the image sensor module in a direction perpendicular to an optical axis, and comprising a second coil disposed on the lens module and a second magnet disposed on the image sensor module,
wherein the second coil is configured to have a shape of a ring having a hollow portion, and the second magnet is disposed in the hollow portion of the second coil.

14. The camera module of claim 13, wherein the second magnet comprises two magnets disposed to be spaced apart from each other in the optical axis direction, and
wherein the two magnets are disposed to allow their poles having the same polarity to face each other in the optical axis direction.

15. The camera module of claim 11, wherein the first magnet comprises a plurality of first magnets each provided on the image sensor module, and the plurality of first magnets are disposed in the hollow portion of the first coil.

16. An electronic device, comprising:
a camera module comprising:
a housing;
a lens module, configured to be fixedly disposed in the housing;
an image sensor module, configured to move in both of an optical axis direction and a direction perpendicular to the optical axis direction; and
a driving unit, configured to move the image sensor module, and comprising one or more coils fixedly disposed in the housing, and one or more magnets attached to the image sensor module;
wherein the one or more coils is configured to have a ring shape with a hollow portion therein, and the one or more magnets is disposed in the hollow portion of the one or more coils.

17. The electronic device of claim 16, wherein the one or more coils are attached to one of the housing and the lens module.

18. The electronic device of claim 16, wherein the one or more magnets are disposed at respective ends of a movable frame of the image sensor module.

* * * * *